United States Patent [19]
Fehlner et al.

[11] Patent Number: 5,474,681
[45] Date of Patent: Dec. 12, 1995

[54] SYNTHESIS OF INORGANIC MEMBRANES

[75] Inventors: James R. Fehlner, Salem Township, Wayne County, Pa.; Warren Ruderman, Demarest, N.J.; Zhenyu Zhang, New York, N.Y.

[73] Assignee: Inrad, Northvale, N.J.

[21] Appl. No.: 864,814

[22] Filed: Mar. 31, 1992

[51] Int. Cl.⁶ .................................................. B01D 71/02
[52] U.S. Cl. ................... 210/500.25; 210/502.1
[58] Field of Search ........................ 55/158, 16; 427/294; 210/510.1, 496, 500.25, 500.26, 502.1; 502/4; 528/5

[56] References Cited

U.S. PATENT DOCUMENTS

| | | | |
|---|---|---|---|
| 4,499,149 | 2/1985 | Berger | 428/447 |
| 4,740,219 | 4/1988 | Kulprathipanja et al. | |
| 4,828,588 | 5/1989 | Hwang et al. | 427/294 X |
| 5,019,263 | 5/1991 | Haag et al. | |
| 5,069,794 | 12/1991 | Haag et al. | |
| 5,110,972 | 5/1992 | Greenlee | 556/460 |

FOREIGN PATENT DOCUMENTS 1235684  4/1988  Canada.

OTHER PUBLICATIONS

Zeolites in Catalysis and Adsorption, D. W. W. Vaughan, *Chemical Engineering Progress*, Feb., 1988, pp. 25–31.
Hayhurst, D. T. and Lee, J. C. Parameters Affecting the Growth of Large Silicalite Crystals, 7th Int'l Zeolite Conference (1986).
Inorganic Membranes for Advanced Separations, 1991 Technology and Business Review.
CAS Search Report directed to Zeolite Membranes.
Sano, T., et al., Preparation and Characterization of ZSM–5 Zeolite Film, "Zeolites" Nov., Dec. 1991 pp. 842–845.
Rolison, Debra R., Ishikawa, et al., Zeolite–Modified Electrodes and Electrode–Modified Zeolites, Debra R. Rolison, Chemical Reviews, vol. 90 (1990) pp. 867–878.
Ishikawa, Akira, et al., Separation of Water–Alcohol Mixtures by Permeation through a Zeolite Membrane on Porous Glass, J. Chem. Soc., chem Commun. (1989) pp. 764–765.

*Primary Examiner*—Frank Spear
*Attorney, Agent, or Firm*—Stroock & Stroock & Lavan

[57] ABSTRACT

Inorganic membranes such as zeolite membranes or other molecular sieve membranes can be provided by using silicone polymer material as starting material. A thin film zeolite membrane or a thin film membrane formed of interlocking zeolite crystals can be provided. Water soluble or water insoluble silicones can be treated in a basic solution under conditions and with an appropriate structure directing template, suitable aluminum content and at a temperature that is appropriate for growing a desired inorganic crystal framework. The continuous thin film membranes or interlocking crystal membranes can be formed on the sides of a reaction vessel, on the surface of the solution or on the surfaces of substrates introduced into the vessel.

51 Claims, No Drawings

SYNTHESIS OF INORGANIC MEMBRANES

BACKGROUND OF THE INVENTION

The invention relates generally to inorganic membranes and more particularly to inorganic membranes synthesized from silicone material.

The use of membranes to separate mixtures is becoming a favored technique for effecting separations. Membrane separations tend to require less energy than competing techniques, such as distillation processes. The use of membranes can also be less costly and more simple to implement.

Inorganic membranes are presently involved with only a small part of the industrial separations market and are typically more expensive to manufacture than organic membranes. Although organic membranes tend to be limited to operating temperatures from 100° to 200° C., inorganic membranes can be functional at temperatures above 1000° C. Inorganic membranes have found many industrial applications in the food and beverage industry. Other applications include the concentration of biomolecules from fermentation liqueurs, separation of gases and purification of polluted water and air.

Various techniques have been employed to form inorganic membranes. Examples include laser drilling and the use of sol gel technology. Sol gels are formed through the acidic or basic catalysis of the hydrolysis of metal or semi-metal alkoxides. The gel can be dried and fired to yield amorphous and ceramic-type materials. Thin films of inorganic material can also be formed on ceramic membranes that have large pores to yield a composite membrane including an inorganic thin film on a porous ceramic support.

There have been several attempts at forming inorganic membranes including zeolitic material. Zeolites are crystalline material that contain silicon oxides and aluminum oxides. Zeolites are formed with a three dimensional structure in which tetrahedra of primarily $SiO_4$ and $AlO_4$ are crosslinked by sharing oxygen atoms whereby the ratio of Si to O atoms is 1:2. Depending on the manner of bonding, the crystal structures can have various ring sizes containing eight, ten or twelve metal/semi-metal atoms. This presence of rings provides a crystal structure with pores and chambers that are of molecular size.

The presence of these chambers promotes the separation of molecules according to their size or their affinity to the zeolitic surfaces. For example, columns of powdered zeolite crystals can be used in the chromatography separation of alkane mixtures by separating branched and straight chain molecules. Gases can be separated with pressure swing absorption techniques. These are currently being used to separate oxygen from air for use by asthma patients. (Ruthyen, D. M., *Chemical Engineering Progress*, 42, Feb. 1988).

Early attempts at forming zeolitic membranes involved the incorporation of zeolite crystals into organic membranes. This is discussed in U.S. Pat. No. 4,740,219, the contents of which are incorporated herein by reference. Although these membranes have advantages over organic membranes, they lack many of the other advantages of inorganic membranes. For example, these membranes lack suitable temperature stability.

The preparation of inorganic membranes including zeolitic material is also described in Sano, T., et al., *Zeolites*, Vol. 11, pp. 842–845 (1991). The article describes forming a gel and heating the gel both with and without stirring. However, it has been found that when such gel synthesis processes are conducted, the resulting product can include significant amounts of zeolite in powder form.

The growth of zeolitic material on glass is described in Canadian Patent No. 1,235,684, which describes using the glass as the silica source for the zeolite crystal structure. However, the product formed in accordance with the methodology disclosed in this patent is most likely an agglomeration of thin flat ZSM-5 zeolitic crystals and not a zeolitic thin film or a film of interlocking crystals.

It has also been proposed to treat porous glass with a mixture of sol gel and other reagents that are appropriate for forming zeolite-A. The resulting zeolite product can provide high separation factors for the ethanol/water separation. This has been reported in Ishikawa, A, *J. Chem. Soc., Chem. Commun.*, 764 (1989). Films of an agglomeration of zeolitic crystals have been observed to form on the walls of autoclaves during the growth of zeolites from gels. These agglomeration films are generally formed in combination with discrete crystals (powders) of zeolites. Membranes formed of such agglomeration films are described in U.S. Pat. No. 5,019,263. The contents of U.S. Pat. No. 5,019,263 and the Ishikawa article are incorporated herein by reference.

Accordingly, conventional methods of forming inorganic membranes having a uniform and suitable structure have been less than completely satisfactory. Similarly, prior art methodology has not achieved a continuous thin film zeolite or a film of interlocking zeolite crystals. Rather, known methodology has achieved an agglomeration of zeolitic powder or a coating of zeolitic crystals on the walls of a ceramic or glass substrate. It is therefore desirable to provide an improved method of producing an improved membrane.

SUMMARY OF THE INVENTION

Generally speaking, in accordance with the invention, inorganic membranes such as those including molecular sieve material can be produced by using silicone polymer material as a starting material. These membranes can include zeolitic material. A continuous thin film zeolite membrane or a thin film membrane formed of interlocking zeolitic crystals can be provided.

In one embodiment, water soluble or water insoluble silicones can be treated to form acceptable inorganic membranes. The silicone can be exposed to basic conditions, with an appropriate structure directing template, suitable aluminum content and at a temperature that is appropriate for growing a desired inorganic crystal framework. The continuous thin film membranes or interlocking crystal membranes can be formed on the sides of a reaction vessel, on the surface of the reaction solution or on the surfaces of substrates introduced into the reaction solution. For example, under ZSM-5 growth conditions, silicone polymers such as those prepared from dichlorosilanes or cyclic dialkyl/aryl siloxanes can be attacked by the hydroxyl group to displace the alkyl groups from the silicon atoms and to break the polymer chains and yield inorganic membranes.

Accordingly, it is an object of the invention to provide an improved method of forming inorganic membranes.

Another object of the invention is to provide improved membranes containing crystalline molecular sieve material.

Another object of the invention is to provide an improved zeolitic membrane.

A further object of the invention is to provide an improved method of forming zeolitic material.

Yet another object of the invention is to provide an improved method for changing the composition of a quantity of fluid.

Still another object of the invention is to provide a zeolitic membrane that is a film of interlocking zeolite crystals or a continuous thin film.

Still other objects and advantages of the invention will in part be obvious and will in part be apparent from the specification.

The invention accordingly comprises the several steps and the relation of one or more of such steps with respect to each of the others, and the membrane possessing the features, properties, and the relation of elements, which are exemplified in the following detailed disclosure, and the scope of the invention will be indicated in the claims.

DETAILED DESCRIPTION OF THE PREFERRED EMBODIMENTS

Inorganic membranes in accordance with the invention can be formed from silicone polymers under basic conditions. The membranes can be true continuous thin films of crystalline material and can also be films of interlocking crystals. In a preferred embodiment of the invention, inorganic membranes are synthesized from polysiloxanes such as polydialkyl siloxanes or polydiarylsiloxanes. The membranes formed can be placed in a suitable frame and can be used to effect separations, to catalyze reactions and to otherwise change the composition of gas or liquid fluid contacting the membrane.

Inorganic membranes, such as those including zeolitic material or other molecular sieve material in accordance with the invention, can be stable over a broad temperature range, approaching and even exceeding 1000° C. and can be relatively inert to most materials. Inorganic membranes, such as zeolitic membranes formed in accordance with the invention, can have channels and chambers having a pore size of from about 4 to 12 angstroms. The crystal structure can include ionic centers, such as when aluminum is incorporated in the crystal framework of a zeolite structure. These centers can interact with molecules having quadruple moments. This provides a second mechanism for separation and can also act as a catalytic center. Accordingly, membranes in accordance with the invention can act as membrane catalysts.

Acceptable inorganic membranes can be synthesized from silicone material, such as various substituted and unsubstituted polysiloxanes. Silicone polymers include long alternating silicon-oxygen chains with organic groups on the open positions of the silicon atoms. Silicone polymers can be prepared from dichlorosilanes or cyclic dialkyl or diaryl siloxanes. When exposed to basic solutions and high temperatures, (such as under conventional ZSM-5 growth conditions) silicone material can be converted into inorganic membranes. The polymer is attacked by the hydroxyl group to displace the alkyl groups from the silicon atoms and to break the polymer chains. The type of group attached to the silicon atoms affects the rate of carbon-silicon bond breaking. Phenyl and other aromatic groups have relatively slow rates of displacement, while allyl groups and α- and β-chloro alkanes have fast rates.

Inorganic membranes in accordance with the invention can be synthesized by using silicones such as polydialkyl (aryl) siloxanes as the only source of silicon. Straight chain and cyclic silicones can be used. Zeolite precursors with four or more silicon atoms can be used. Silicones have different water solubilities and can be dissolved in a solution for growing zeolites. A layer of silicone can also be disposed on a substrate and immersed in the solution.

A solution for growing zeolitic material from silicone generally contains a base and can also contain a source of aluminum and a structure directing template for directing the growth of the desired framework. Acceptable bases include NaOH and $NaHCO_3$; the source of aluminum can be $Al_2O_3$ or $NaAlO_2$; and the template can be tetrapropylammonium bromide (TPA-Br) for the ZSM-5 framework or sodium ions for the zeolite-Y framework. The silicone and basic solution are heated at about 90° C. to 300° C., or higher, preferably at 100° to 200° C., for more than about four hours preferably more than 24 hours. An acceptable inorganic membrane can be synthesized from polysiloxane material and a solution of about 1 to 2% NaOH and any of about 1 to 15% TPA-Br and 0.1 to 0.3% $NaAlO_2$, heated at about 150° to 200° C.

The silicon source and base and optionally the aluminum source and template are heated at a temperature at which the desired zeolite framework is formed. The appropriate conditions for forming different types of zeolites from conventional starting materials such as $SiO_2$ are well known to those in the art. For example, to form a ZSM-5 framework, the solution or gel is heated at about 180° C. To form a zeolite-Y framework, the solution or gel is heated to about 100° C. Different zeolites are described in U.S. Pat. No. 5,019,263 at column 4, lines 8–24. Zeolite growth will generally take place during a period of from one to several days. If the conditions for forming a desired zeolite involve pressures above one atmosphere, the solution or gel can be heated in an autoclave.

The solution can be placed in a container with a Teflon surface. Inorganic membranes can form on the surface of the container. Stainless steel or an other relatively inert surface is also acceptable. Teflon surfaces have an advantage that it is easier to remove the membrane without breakage. However, it can be advantageous to grow a composite membrane on a porous surface and to leave the membrane in place so that the composite membrane will have greater strength. After the membrane is formed, it can be calcined at temperatures up to and exceeding 200° C. for about 1–50 hours.

If the silicone polymer is a solid and is insoluble in water, the silicone can be converted to a zeolite membrane directly. Otherwise, it can be solubilized. In that case, the solubilized silicone will tend to be converted to a membrane on the sides of the container or on the surface of the solution.

The type of product formed depends on the conditions of membrane growth. These conditions include the thickness of the polymer, the temperature and the reactants in the solution. Membranes can be grown to thicknesses of up to 500 and even 2,000 microns. Crystal sizes of zeolitic crystals, for example can be about 1–150 microns and frequently over 30 microns in size. Membrane growth will be observed both on the side of the vessel and on the surface of the solution. Generally, both types of growth will be observed. The silicone can also be enclosed in a sealed bag formed from extra coarse Teflon membrane for example. Dissolved material can easily migrate through such a bag. The solution will be seen to penetrate the bag, dissolve the silicone and form a zeolite membrane outside of the bag.

Inorganic membranes formed in accordance with the invention can be formed in a true three dimensional structure in which tetrahedra of primarily $SiO_4$ are bonded to common oxygen atoms. By varying the starting materials and synthesis conditions, the manner of this bonding can be selected. The tetrahedra can form basic units by forming 4, 5, 6, 8, 10 or 12 membered rings of interconnecting tetrahedra. Double rings can also be formed. The manner by which the rings can be interconnected determines the framework.

Cavities will be present in the framework and the entrance of the cavity forms a structure of 6, 8, 10, 12 or larger member rings. The cavities will therefore have uniform diameter and can act as a molecular sieve for molecules of different sizes.

The silicones used in the inorganic membrane formation process can be formed with different functional groups, as desired, to obtain polymers and inorganic membranes having different desirable properties. For example, the water solubility of the silicone can be increased by adding polar side groups, such as carboxylic acid, to the silicon atoms. Carboxylic acids are especially attractive because they will form salts in the basic solutions used to synthesize zeolite type membranes.

The rate of conversion of the organosilicones to inorganic membranes, such as zeolite membranes, can also be controlled by incorporating different organic groups within the silicone material. Although methyl groups work well, if higher rates of conversion are required, better leaving groups, such as chloromethyl or allyl groups can be used instead. Those of skill in the art will also note that different groups will be most appropriate for growing zeolite membranes at different temperatures.

By incorporating different elements in the silicone polymer, it is possible to incorporate those elements into the inorganic membrane framework. For example, it is known how to bond elements such as aluminum, boron and titanium to silicon through oxygen bridges. These elements will then be incorporated into the silicone polymer chains and would be available for incorporation into the membrane framework.

The term "molecular sieve" is a common and well understood term of art and describes a wide variety of crystalline material. The material is generally characterized as an aluminosilicate although other crystalline material is included by the term "molecular sieve". Zeolites are a type of molecular sieve. Conventional molecular sieve membranes are discussed in U.S. Pat. No. 4,268,420. Membranes containing molecular sieve material having the following general formula can be synthesized in accordance with the invention.

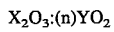

$$X_2O_3:(n)YO_2$$

wherein X is a trivalent element such as Al, B, Fe, Ga and combinations thereof; Y is a tetravalent element such as Si, Ge, Ti and combinations thereof; and n is an integer having a value of at least 2 and typically from about 20 to about 10,000.

Inorganic membranes in accordance with the invention can be identical in composition and framework to known zeolites, such as ZSM-5 having the MFI structure. Zeolites have come to be designated by letters of other convenient terms, as set forth in U.S. Pat. No. 5,019,263, the contents of which are incorporated herein by reference. The ratio of silicon to aluminum can also be varied. In fact silicalite, a commercially available molecular sieve sold by Union Carbide, contains no detectable aluminum, yet has the same pore size and framework as ZSM-5. Other commercially available zeolitic types are described in Chemical Engineering Progress, February 1988, which is incorporated herein by reference.

The zeolitic membranes in accordance with the invention that are formed from silicone polymers as the silica source typically have superior physical properties, compared to zeolitic membranes synthesized from gels. The membranes formed from silicone polymers will exhibit greater cross-linking among the interlocking crystals. This is due in part to sharing of polymer chains among crystals. Furthermore, zeolite membranes formed from silicone polymers can be in the form of true continuous zeolite thin films.

Zeolite membranes in accordance with the invention can be used as catalysts as well as for separating materials by contacting fluid against the membrane. Examples of mixtures that can be separated with zeolite membranes include oxygen/nitrogen, nitrogen/methane, carbon dioxide/methane, hydrogen/carbon monoxide, ethanol/water, branched hydrocarbons/straight hydrocarbons, specific types of xylene isomers/other xylene isomers, concentration of biomolecules from fermentation liquors and for the purification of natural gas or flu stack effluents.

Zeolitic membranes can also be useful in electrochemical systems, as described by Rolison, D. R. *Chem. Rev.*, 90, 867 (1990), the contents of which are incorporated herein by reference. Composite membranes containing zeolites and pressed zeolite pellets have found application in both batteries and electrodes. However, a true continuous zeolite membrane thin film or a membrane of interlocking crystals would provide benefits and superior properties, compared to current zeolite membranes.

The zeolitic membranes formed in accordance with the invention could also be useful in catalytic systems. The aluminum centers in zeolites can serve as catalytic sites. The aluminum has a net negative charge and therefore must have an associated cation. If the cation is a hydrogen ion, then the zeolite is referred to as being in the acidic form. This acidic form has been found to be very valuable in catalytic cracking as well as other hydrocarbon conversions. These include dehydrogenation, the conversion of olefins and paraffins to aromatics, the conversion of alcohols and ethers to hydrocarbons, the alkylation of aromatics, the disproportionation of toluene and the isomerization of xylenes.

The cation can also be a metal ion, such as sodium. If the counter ion for the aluminum is a metal, the zeolite is generally referred to as being in the neutral state. However, neutral state zeolites can carry out base catalyzed reactions. For example, such zeolites can be used to catalyze dehydrohalogenation reactions at temperatures as low as 40° to 50° C.

Transition metal ions such as platinum can be incorporated into the zeolite in place of hydrogen or sodium, by carrying out an ion exchange reaction. The platinum ions can be reduced to the metal form and can provide platinum agglomerates in the pores and channels of the zeolite. These metal agglomerates can serve as catalytic centers for the oxidation or reduction of organic materials. In each of these applications, acid, base and noble metal catalysis, the zeolitic membranes in accordance with the invention present a promising alternative to current technologies that employ powdered zeolites in fluidized and fixed beds.

Zeolitic membranes are particularly well suited for conducting photochemical reactions. For example, when 7-dehydrocholesterol is photolyzed in zeolite-Y, a much higher percentage of pre-vitamin $D_3$ is obtained than when it is photolyzed in solution. Furthermore, high terminal selectivity can be obtained in the photochlorination of a long chain alkanes adsorbed on ZSM-5 zeolites. However, current technology using conventional fluidized beds provides inadequate photoefficiency. Even if fluidized bed efficiencies can be increased, it is still necessary to remove the product from the zeolite particles. However, by contacting a stream of reactant to a zeolite membrane illuminated with light of an appropriate wavelength impinging on the exterior surface of the membrane, the reaction will take place in the membrane and the product will exit the membrane without further processing. This will maximize the efficient use of light, control the exposure time per molecule and eliminate the need for extracting the product from the zeolite.

Zeolitic membranes in accordance with the invention could also be useful to separate the electrodes in a fuel cell. The membranes that are currently used are made of ionomers which are expensive and are limited to a maximum operating temperature of 80° C. A zeolite membrane plugged with carbon, such as by a coking process would permit the migration of hydrogen ions, but prevent the passage of hydrogen and oxygen molecules. Such a membrane would have an operating temperature in the range of several hundred degrees. Zeolite membranes could also be valuable as components in the fuel cell electrodes.

The films formed in accordance with the invention can be placed in an appropriate frame and can effect separations and can catalyze chemical reactions. The membranes can be configured as flat sheets, honeycombs or tubes. Honeycomb cross-flow membranes and tube membranes can provide very high filtration rates and are easy to clean. The membranes can also be formed on metal frits or porous ceramic surfaces.

Aspects and embodiments of the invention will be explained in greater detail with reference to the following examples. These examples are presented for purposes of illustration only and are not intended to be construed in a limiting sense.

EXAMPLE 1

An inorganic membrane was formed from silicone as a starting material. Silastic 590, a silicone product, is a polydimethysiloxane and contains vinyl groups attached to silicon atoms and finely divided $SiO_2$ powder dispersed in the polymer. Silastic 590 is a filled 2-part formulation available from Dow Corning Company. By mixing and thermosetting the mixture, it is possible to form a cross-linked silicone film with very desirable properties for the use in the synthesis of zeolite films. It is flexible, yet strong and stable at 180° C.

Silastic 590 from Dow Corning was hardened according to the directions. Equal parts of part A and part B were mixed and a thin layer of the mixture was coated on a glass plate. The plate was placed in an oven and heated at 180° C. until the polymer hardened. After the silicone polymer was permitted to cool, it was removed from the glass plate.

A less than 1 mm thick portion of the film (approximately 0.3 g) was placed in a Teflon lined vessel and covered with an aqueous solution (approximately 20 ml) containing an aluminum source (0.2% $NaAlO_2$), a base (1.4% NaOH) and a template (8.6% TPA-Br). All percentages recited in the Examples are on a weight basis. The film and solution were heated in an autoclave at 180° C. for three days. A thin film of inorganic material was formed. Portions of the thin film were washed with distilled water and examined under 500X magnification. Small balls having faceting at random angles were observed in the film. This evidences that the balls were interlocking crystals. The material was examined by X-ray diffraction and was found to include ZSM-5 zeolite and quartz which is assumed to have come from the filler.

The material was then tested to confirm the ZSM-5 structure. Hexane adsorption of the calcined zeolite gave 8% adsorption by weight. This was compared to Silicalite, which is a commercial high silicon material having substantially the same framework as ZSM-5. Silicalite exhibited 11% hexane adsorption. Accordingly, it was concluded that a ZSM-5 membrane had been formed from the Silastic 590.

EXAMPLE 2

Silastic 590 was cured according to directions and a 20×15×1 mm piece was sealed in a porous pouch formed of 5 micron Teflon membrane. The Teflon membrane was covered by the solution of Example 1 and heated at 180° in an autoclave for 4 days. On opening, the pouch was found to have a minor break that is assumed not to have affected the results. Some membrane growth had taken place on the Teflon side of the vessel holding the solution. However, most of the polymer in the bag had been converted to zeolite film in place.

EXAMPLE 3 (for comparison)

Finely divided $SiO_2$ powder available from the Aesar company, 30 Bond St. Ward Hill Mass. 01835 (approximately 15 g) was sealed in the Teflon bag of Example 2. The bag was covered with the solution from Example 2 and heated in an autoclave under the same conditions. The bag was found to be intact and full of solution. There was no film formed on the sides of the container and the solid inside the bag appeared identical to the starting Aesar $SiO_2$ when examined under a microscope. Accordingly, it was concluded that zeolite membranes cannot be formed under the conditions of Examples 1–3, using $SiO_2$ as the silicon source. However, zeolite membranes will form when silicone polymer is used as the source.

EXAMPLE 4

In order to include template material in the polymer material, Silastic 590 was cured at 75° C. with 8% tripropylamine. A portion similar in size to that of Example 2 of the cured Silastic 590 was covered with a solution containing 0.2% $NaAlO_2$ and 1.4 NaOH, but no TBA-Br. The silicone and solution were heated in a vessel for two days at 180° C. The solution was found to have an oily surface and a film was found at the bottom of the vessel as was some powder. Microscopic examination of the film showed that it was very similar in structure to the film formed in Example 1. Accordingly, it was concluded that the template can be incorporated into the cured polymer and need not be added in the solution.

EXAMPLE 5

Both parts of Silastic 590 are not needed to form the inorganic membranes. Part B only of Silastic 590, a viscous liquid, was coated onto a Teflon plate. The plate was approximately circular in shape and 15–20 mm in diameter. The coating was about 1 mm thick. The coated plate was covered with a solution containing 1.4% NaOH and 8.6% TBA-Br in a Teflon lined vessel. The container was heated at 180° C. for two days. Some material was formed on the bottom of the vessel. There was also a film of material formed on the Teflon plate. Microscopic examination of that material showed that it was a film having integrated highly faceted crystals and was concluded to be silicalite. Accordingly, part B of uncured Silastic 590 can be converted to an inorganic membrane.

EXAMPLE 6

Inorganic membranes can also be formed from unfilled silicone polymer. Sylgard 184 was prepared and cured at 75° C. Sylgard 184 is an unfilled silicone polymer available from the Dow Corning Company. A 0.6745 gram piece of the cured polymer was placed in a Teflon lined vessel containing about 20 ml of an aqueous solution including 1.4% NaOH and 8.6% TBA-Br. The vessel was heated at 180° C. for six days. A silicalite film had formed over the bottom and sides of the container and had formed a dome over the top of the solution. The side of the membrane towards the container was a poorly defined bumpy surface. The side of the membrane towards the solution showed a well defined grid of interlocking crystals having a ZSM-5 type framework.

EXAMPLE 7

Uncured Sylgard 184 was coated on a Teflon plate and covered with solution as in Example 6. The polymer and solution were heated for six days at 180° C. and a thin zeolite membrane was found to have formed on the Teflon plate. The film showed a well defined network of crystals on both sides. The side closest to the Teflon exhibited much smaller crystals than did the side facing the solution.

EXAMPLE 8

A 0.6 gram sample of Sylgard 184 was treated as in Example 6 and was heated for five days at 180° C. A film having well defined interlocking crystals was formed. The film was ground and examined by X-ray diffraction. The results showed that the sample was approximately 100% silicalite. The ground-up membrane adsorbed 11% hexane by weight, the same amount adsorbed by commercial silicalite. The membrane was examined by atomic absorption analysis which showed that the amount of aluminum present was below the detection limits of the instrument, less than 1 mg of Al to 233 mg of silicon.

EXAMPLE 9

A zeolite membrane was prepared as in Example 8, except that 0.2% $NaAlO_2$ as an aluminum source was added to the solution. The ground membrane had an X-ray diffraction pattern essentially identical to that obtained from Example 8. Atomic absorption analysis showed 1.39 mg of aluminum per 386 mg of silicon. Accordingly, it was possible to incorporate aluminum from solution into the crystal network and form a zeolite membrane.

EXAMPLE 10

The procedures of Example 10 were substantially the same as those of Example 8. However, a transparent film was formed that did not show any observable crystalline structure. The membrane was ground and shown to contain silicalite together with amorphous silica. Accordingly, it was concluded that a true continuous zeolite membrane thin film had been formed.

EXAMPLE 11

To solubilize cross-linked silicone polymer, 0.62 grams of Sylgard 184 was dissolved in 19.66 grams of $D_2O$ containing 0.90 grams of 40% NaOD in $D_2O$. The solution was heated at 180° C. for five days and then filtered. A $^1H$ NMR of the filtrate was taken and the presence of Si-$CH_3$ from the silicone polymer was observed. Accordingly, it was concluded that the cross-linked silicone polymer was solubilized in the basic solution.

EXAMPLE 12

Sylgard 184 was treated with NaOD/TPA-Br/$D_2O$ solution heated to 180° C. for 1½ days. The reaction product was filtered and $^1H$ NMR show the presence of silicone polymers. Accordingly, the presence of TPA-Br in solution does not prevent solubilization of the silicone polymer.

EXAMPLE 13

An inorganic membrane was formed from pure polydimethyl siloxane. Polydimethyl siloxane was prepared by adding dimethyldichlorosilane to a sodium hydroxide solution and stirring the solution until silicone polymer material collected as a viscous oily material at the top of the solution. The oily silicone polymer material was separated from the remaining viscous solution.

0.61 grams of collected silicone material was added to a NaOH/TPA-Br solution having approximately the same composition as in Example 6. The polymer and solution were heated in an autoclave at 180° C. for 7 days. On opening the autoclave, a very high quality zeolite thin film membrane was found at the bottom of the container. Membrane films were also formed on the sides of the container and over the top of the solution. The membrane film was semitransparent and was formed of interlocking crystals having a diameter of approximately 10 to 40 microns. The mass of the films collected was 0.20 grams. No individual crystals or crystal agglomerates were found in the autoclave. Accordingly, it was concluded that high quality inorganic membranes could be formed from pure polydimethylsiloxane.

EXAMPLE 14

An inorganic membrane film was formed from a cyclic silicone. 0.66 grams of decamethylcyclopentasiloxane was reacted with an NaOH/TPA-Br solution as in Example 13. 0.03 grams of zeolite film was collected. The film was thinner than in Example 13 and was formed from larger interlocking crystals, having a diameter of approximately 30 to 100 microns. It was concluded that cyclic siloxanes are converted to zeolites more slowly than are linear siloxanes. It was also concluded that the structure of the silicone material has an effect on the structure of the membrane.

EXMAPLE 15

0.65 grams of decamethyltetrasiloxane was reacted with NaOH/TPA-Br solution, as in Example 14. A small amount of zeolite film was recovered, together with agglomerates of zeolite crystals having a diameter of about 150 microns. The total mass of zeolite material collected was 0.11 grams.

EXAMPLE 16

A chlorination reaction was carried out by combining a hydrocarbon and chlorine gas in a membrane formed in accordance with the invention, in the presence of light. An inorganic membrane was prepared as set forth in Example 13. 0.88 g of polydimethylsiloxane was converted to an inorganic membrane and the membrane was calcined at 650° C. for 90 minutes. The membrane weighed 54.1 mg and three ml of a dichloromethane solution containing 3.3 mg of n-dodecane was poured over the membrane. The solvent was removed under a stream of nitrogen and the membrane was allowed to sit until it reached a constant weight of 57.9 mg. The loaded membrane was then placed into a beaker which was purged with nitrogen. The beaker was covered and 2.6 ml of chlorine gas was added. The beaker was then irradiated for 20 minutes with a Black-Ray model B-100A lamp which has a maximum at 365 nm. The membrane was extracted with dichloromethane for thirty minutes. The dichloromethane was then removed under a stream of nitrogen and hexane was added.

It was determined by a gas chromatographic analysis that 28% of the dodecane had been converted to chlorinated hydrocarbon. The selectivity data obtained agreed with values reported for silicalite in U.S. Pat. No. 4,971,664, Examples 104 and 110. The terminal selectivity ($S_0$) was 1.2 (36% of the monochlorinated product was 1-chlorodecane ($S_T$)) versus 0.3 to 0.4 which is common for solution photochemistry ($S_T$=10–12%). The percentage of monochlorinated product in the product mixture ($S_M$) was 84%.

Accordingly, it was demonstrated that membranes in accordance with the invention are useful for carrying out regiocontrolled reactions. Chlorine can be mixed with hydrocarbon and the mixture can be passed through an illuminated membrane. This will lead to better control of stoichiometric ratios of reagents compared with many conventional fluidized bed systems.

It will thus be seen that the objects set forth above, among those made apparent from the preceding description, are efficiently attained and, since certain changes may be made in carrying out the above process and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of forming an inorganic membrane of crystalline inorganic material that can change the composition of fluid contacting the membrane, comprising the steps of:

providing a quantity of polyalkylsiloxane silicone material;

placing the silicone material in intimate contact with an aqueous solution comprising an effective amount of a selected structure determining template material to direct the formation of a desired inorganic crystalline material and an effective amount of an aqueous basic solution of an effective strength for initiating a chemical reaction of the silicone material into inorganic material;

and heating the aqueous solution containing silicone, base and structure determining template material to a temperature of about 90° C. to about 300° C. for sufficient time to permit the silicone material to undergo molecular rearrangement into crystalline inorganic material.

2. The method of claim 1, wherein the structure determining template material comprises organic amines or amine salts.

3. The method of claim 1 wherein the structure determining template material comprises TPA-Br.

4. The method of claim 1, wherein the silicone material includes at least one cyclic polysiloxane compound.

5. The method of claim 1, wherein the starting materials and conditions are selected so that at least a portion of the layer of inorganic material formed has a zeolitic structure and framework.

6. The method of claim 1, wherein the starting materials and conditions are selected so that at least a portion of the layer of inorganic material formed consists of interlocking porous crystals.

7. The method of claim 1, wherein the silicone, template material and base are heated to a temperature from about 100° C. to about 200° C. for more than four hours.

8. The method of claim 1, wherein the silicone, template material and base are heated to a temperature of from about 90° C. to about 300° C. for more than four hours.

9. The method of claim 1, wherein the silicone, base and template are heated to a temperature of from 100° to 200° C. for more than 24 hours.

10. The method of claim 9, wherein the layer of inorganic material is formed on a Teflon substrate and removed therefrom.

11. The method of claim 9, wherein the layer of inorganic material is formed on a porous substrate.

12. The method of claim 1, wherein the starting materials and conditions were selected to produce a membrane having portions consisting essentially of crystalline molecular sieve material.

13. The method of claim 12, wherein the molecular sieve material has the general formula:

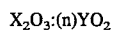

wherein X is a trivalent element selected from the group consisting of aluminum, boron, iron and gallium and combinations thereof; Y is a tetravalent element selected from the group consisting of silicon, germanium, titanium, and combinations thereof; and n is at least 2.

14. A method of forming zeolite material, comprising the steps of intimately combining an aqueous basic solution, structure determining template material selected to promote the formation of zeolite material and silicone polymer material and heating the combination at a temperature between about 100° C. and about 200° C. for over four hours under conditions to form zeolite material in the form of one of interlocking zeolite crystals and a continuous zeolite thin film.

15. The method of claim 14, including the step of heating the reacting basic solution and silicone for more than twelve hours.

16. The method of claim 15, wherein the silicone material comprises polyalkylsiloxane.

17. The method of claim 16, wherein a polysiloxane is combined with a basic solution containing about 1 to 2% NaOH and about 7 to 10% TPA-Br and heated at about 150°–200° C.

18. The method of claim 17, wherein the solution includes about 0.1 to 0.3% $NaAlO_2$.

19. The method of claim 16, wherein a polydimethylsiloxane is combined with a basic solution containing about 1 to 2% NaOH and about 1 to 10% TPA-Br.

20. The method of claim 16, wherein the template is selected from the group consisting of organic amines and amine salts.

21. The method of claim 10, wherein the basic solution and silicone material are heated with tetrapropylammonium bromide (TPA-Br).

22. The method of claim 14, wherein the silicone material includes Silastic 590.

23. The method of claim 14, wherein the silicone material includes Sylgard 184.

24. The method of claim 14, wherein the silicone material is unfilled polysiloxane material.

25. The method of claim 14, wherein the basic solution and silicone are heated with a source of aluminum.

26. The method of claim 25, wherein the source of aluminum is $NaAlO_2$.

27. The method of claim 14, wherein the reaction conditions and starting materials are selected so that the zeolitic material formed has the ZSM-5 framework.

28. The method of claim 14, wherein the reaction conditions and starting materials are selected so that the zeolitic material formed has the MFI framework.

29. The method of claim 14, wherein the silicone polymer is cross-linked in three dimensions.

30. The method of claim 14, wherein the silicone material is water soluble or water dispersable.

31. The method of claim 14, wherein the silicone material includes a side group selected from the group consisting of alcohol groups, carboxylic acid groups, sulfonic acids groups, halogenated groups, aromatic groups and groups containing double bonds.

32. The method of claim 14, wherein the silicone is copolymerized with at least one metal oxide.

33. The method of claim 14, wherein the polymer is first solubilized and then formed into zeolitic material.

34. The method of claim 14, wherein reaction conditions are controlled to provide zeolitic material in the form of interlocking crystals having a crystal diameter of from about 10 to 150 microns.

35. The method of claim 14, wherein conditions are controlled to provide zeolitic material in the form of interlocking crystals having a thickness of from 500 to 2000 microns.

36. The method of claim 14, wherein reaction conditions are controlled to provide zeolitic material in the form of a continuous zeolite thin film.

37. The method of claim 14, wherein the silicone polymer includes siloxane rings tied together by alkyl groups.

38. The method of claim 14, wherein the silicone material includes polydimethylsiloxane.

39. The method of claim 14, including incorporating elements or side groups on the polymer material and incorporating those elements or side groups as part of the zeolite framework.

40. A method of forming crystalline molecular sieve material, comprising providing in intimate contact, a quantity of silicone material, an aqueous basic solution of an effective strength for initiating a chemical reaction of the silicone material into inorganic material and a structure determining template material selected from the group consisting of sodium ions, amines, salts of amines, TPA-Br and combinations thereof for causing the inorganic material to have a molecular sieve structure and reacting the silicone material, base and template material with heat at a temperature from about 100° C. to about 200° C. for over four hours to chemically convert the silicone material into crystalline molecular sieve material.

41. The method of claim 40, wherein the structure determining template material is TPA-Br.

42. The method of claim 40, wherein the starting materials and conditions are selected so that at least a portion of the layer of inorganic material formed consists of interlocking zeolite crystals.

43. The method of claim 40, wherein the reaction conditions and starting materials are controlled and selected so that the molecular sieve crystal structure has the ZSM-5 framework.

44. The method of claim 40, wherein the starting materials and reaction conditions are selected so that the molecular sieve is silicalite.

45. An inorganic membrane that can change the composition of fluid contacting the membrane, formed by the steps, comprising combining and reacting silicone material with a basic solution and structure determining template material, with heat, to form a layer of inorganic material and forming a membrane from the layer of inorganic material.

46. The inorganic membrane as claimed in claim 45, wherein the inorganic material has the composition in terms of mole ratios of oxides as follows:

$$X_2O_3:(n)YO_2$$

wherein X is a trivalent element selected from the group consisting of aluminum, boron, iron and gallium and combinations thereof; Y is a tetravalent element selected from the group consisting of silicon, germanium, titanium, and combinations thereof; and n is at least 2.

47. The inorganic membrane as claimed in claim 46, including a nobel metal in the molecular sieve.

48. The inorganic membrane as claimed in claim 47, wherein the silicone and base are heated to a temperature from about 90° C. to about 300° C.

49. The inorganic membrane claimed in claim 48, wherein the silicone, base and template are heated to a temperature of from 100° to 200° C. for more than 24 hours.

50. The inorganic membrane as claimed in claim 45, including sodium in the molecular sieve.

51. The inorganic membrane as claimed in claim 50, wherein the starting materials and conditions are selected so that at least a portion of the layer of inorganic material formed has a zeolite structure and framework.

* * * * *